United States Patent
Maslov et al.

(10) Patent No.: US 6,822,368 B2
(45) Date of Patent: Nov. 23, 2004

(54) ROTARY PERMANENT MAGNET ELECTRIC MOTOR HAVING STATOR POLE SHOES OF VARYING DIMENSIONS

(75) Inventors: Boris A. Maslov, Reston, VA (US); Zareh Soghomonian, Sterling, VA (US)

(73) Assignee: Wavecrest Laboratories, LLC, Dulles, VA (US)

( * ) Notice: Subject to any disclaimer, the term of this patent is extended or adjusted under 35 U.S.C. 154(b) by 0 days.

(21) Appl. No.: 10/207,847

(22) Filed: Jul. 31, 2002

(65) Prior Publication Data

US 2004/0021395 A1 Feb. 5, 2004

(51) Int. Cl.[7] .......................... H02K 1/12; H02K 3/00; H02K 2/00; H02K 15/02
(52) U.S. Cl. ............. 310/254; 310/156.59; 310/154.45; 310/154.01; 310/68 B; 310/269; 310/187
(58) Field of Search .................. 310/68 B, 154.01, 310/269, 154.45, 254, 218, 156.59, 187, 257, 259

(56) References Cited

U.S. PATENT DOCUMENTS

| | | | | |
|---|---|---|---|---|
| 3,007,068 A | * | 10/1961 | Arnold | 310/172 |
| 4,583,015 A | * | 4/1986 | Toshimitsu | 310/187 |
| 4,638,201 A | | 1/1987 | Feigel | 310/216 |
| 4,786,834 A | | 11/1988 | Grant et al. | 310/194 |
| 4,864,176 A | | 9/1989 | Miller et al. | 310/194 |
| 5,717,316 A | * | 2/1998 | Kawai | 322/46 |
| 5,918,360 A | * | 7/1999 | Forbes et al. | 29/596 |
| 6,181,035 B1 | | 1/2001 | Acquaviva | 310/51 |
| 6,188,159 B1 | | 2/2001 | Fan | 310/254 |
| 6,384,496 B1 | * | 5/2002 | Pyntikov et al. | 310/68 B |
| 6,492,756 B1 | * | 12/2002 | Maslov et al. | 310/156.12 |
| 6,584,813 B2 | * | 7/2003 | Peachee et al. | 68/23.6 |
| 6,617,746 B1 | * | 9/2003 | Maslov et al. | 310/254 |

FOREIGN PATENT DOCUMENTS

| | | | |
|---|---|---|---|
| DE | 199 24 038 | 11/2000 | .......... H02K/21/22 |
| EP | 58186343 | 10/1983 | ............ H02K/1/14 |
| EP | 2001-186743 | 7/2001 | .......... H02K/29/00 |
| WO | WO 03/030333 | 4/2003 | |

OTHER PUBLICATIONS

"Study of Cogging Torque in Permanent Magnet Machines", C. Studer, A. Keyhani, The Ohio State University, and T. Sebastian, S. Murthy, Saginaw Steering Systems, Delphi, Saginaw, MI, date unknown.

Technical Report, "Study of Cogging Torque in Permanent Magnet Machines", C. Studer and A. Keyhani, The Ohio State University, 1998.

"Shape Optimization for Electromagnetic Devices" date unknown.

* cited by examiner

*Primary Examiner*—Tran Nguyen
*Assistant Examiner*—J. Aguirrechea
(74) *Attorney, Agent, or Firm*—McDermott Will & Emery LLP

(57) ABSTRACT

Rotary permanent magnet motors have salient stator poles with nonuniform pole thickness in the radial direction for compensating effects of cogging torque. Pole base portions terminate at pole shoes at the radial air gap. The pole shoes extend in the circumferential direction from the bulkier base portions. Variation of the thickness of the pole shoe changes the concentration of the effective flux at the point of coupling between the stator poles and the permanent magnet pole shoes. As there is no change in the active interfacing area of the pole shoes a uniform air gap is maintained. The torque signature for each stator pole/rotor permanent magnet interface can be selectively changed to smooth motor operation by configuring the stator pole shoe thickness to vary along its circumferential extent as appropriate. Pole shoes may have tapered leading or trailing edges with respect to a pole base to change the effective flux density in the air gap at a specific pitch of rotation. Additionally, the pole shoe may be shifted off center with respect to the pole base.

13 Claims, 8 Drawing Sheets

ROTARY PERMANENT MAGNET ELECTRIC MOTOR HAVING STATOR POLE SHOES OF VARYING DIMENSIONS

RELATED APPLICATIONS

This application contains subject matter related to copending U.S. application Ser. No. 09/571,174 of Pyntikov et al., filed May 16, 2000, copending U.S. application Ser. No. 09/826,423 of Maslov et al., filed Apr. 5, 2001, copending U.S. application Ser. No. 09/826,422 of Maslov et al., filed Apr. 5, 2001, U.S. application Ser. No. 09/966,101 of Maslov et al., filed Oct. 1, 2001, copending U.S. application Ser. No. 10/067,305 of Maslov et al., filed Feb. 7, 2002, copending U.S. application Ser. No. 10/160,257 of Maslov et al., filed Jun. 4, 2002, and copending U.S. application Ser. No. 10/160,254 of Maslov et al., filed Jun. 4, 2002, all commonly assigned with the present application. The disclosures of these applications are incorporated by reference herein.

FIELD OF THE INVENTION

The present invention relates to rotary electric motors, more particularly to permanent magnet motors having pole shoes of varying thickness in the radial direction.

BACKGROUND

The above-identified copending related U.S. patent application of Maslov et al., Ser. No. 09/826,423, identifies and addresses the need for an improved motor amenable to simplified manufacture and capable of efficient and flexible operating characteristics. In a vehicle drive environment, for example, it is highly desirable to attain smooth operation over a wide speed range, while maintaining a high torque output capability at minimum power consumption. Such a vehicle motor drive should advantageously provide ready accessibility to the various structural components for replacement of parts at a minimum of inconvenience. The above-identified copending related U.S. applications describe formation of electromagnet core segments as isolated magnetically permeable structures configured in an annular ring. With such arrangements, flux can be concentrated to provide advantageous effects as compared with prior art embodiments.

As described in the above-identified Maslov et al. applications, isolation of the electromagnet core segments permits individual concentration of flux in the magnetic cores, with a minimum of flux loss or deleterious transformer interference effects from interaction with other electromagnet members. Operational advantages can be gained by configuring a single pole pair as an isolated electromagnet group. Magnetic path isolation of the individual pole pair from other pole groups eliminates a flux transformer effect on an adjacent group when the energization of the pole pair windings is switched. The lack of additional poles within the group avoids any such effects within a group. Further benefits are described from utilization of three dimensional aspects of motor structure, such as a structural configuration wherein axially aligned stator poles and axially aligned rotor magnets provide highly concentrated flux density distribution in the active air gap of the machine. Such configuration provides a greater number of poles with the same individual active air gap surface areas and/or greater total active air gap surface area than conventional motors having the same air gap diameter.

In addition to benefits of flux concentration obtainable with the configurations described above, recently introduced neodymium-iron-boron (NdFeB) magnetic materials can produce larger flux densities than other permanent magnetic materials previously used in brushless machines, thus increasing torque output capacity. The use of high density producing permanent magnets in motors which comprise a great number of poles presents a concern for ameliorating undesired effects that can be introduced by cogging torque. Cogging torque is produced by magnetic attraction between the rotor mounted permanent magnets and those stator poles that are not in a selectively magnetized state. This attraction tends to move the rotor magnet to an equilibrium position opposite a stator pole to minimize the reluctance therebetween. As the rotor is driven to rotate by energization of the stator, the magnitude and direction of the cogging torque produced by magnet interaction with non-energized electromagnet segments changes periodically to oppose and, alternately, to add to the torque produced by the energized stator segments. In the absence of compensation, cogging torque can change direction in an abrupt manner with the rotation of the rotor. If cogging torque is of significant magnitude, it becomes a rotational impediment, as well as a source of mechanical vibration that is detrimental to the objectives of precision speed control and smooth operation.

As an illustration of the development of cogging torque, a motor such as disclosed in the copending application Ser. No. 09/826,422, is considered. The disclosure of that application has been incorporated herein. FIG. 1 is an exemplary view showing rotor and stator elements. Rotor member 20 is an annular ring structure having permanent magnets 21 spaced from each other and substantially evenly distributed along cylindrical back plate 25. The permanent magnets are rotor poles that alternate in magnetic polarity along the inner periphery of the annular ring. The rotor surrounds a stator member 30, the rotor and stator members being separated by an annular radial air gap. Stator 30 comprises a plurality of electromagnet core segments of uniform construction that are evenly distributed along the air gap. Each core segment comprises a generally u-shaped magnetic structure 36 that forms two poles having surfaces 32 facing the air gap. The legs of the pole pairs are wound with windings 38, although the core segment may be constructed to accommodate a single winding formed on a portion linking the pole pair. Each stator electromagnet core structure is separate, and magnetically isolated, from adjacent stator core elements. The stator elements 36 are secured to a non-magnetically permeable support structure, thereby forming an annular ring configuration. This configuration eliminates emanation of stray transformer flux effects from adjacent stator pole groups. Appropriate stator support structure, which has not been illustrated herein so that the active motor elements are more clearly visible, can be seen in the aforementioned patent application.

FIG. 2 is a partial plan layout of two adjacent stator core elements 36, with pole faces 32 denominated A–D, in relation to the rotor magnets, denominated 0–5, during motor operation. The positions of the rotor magnets are depicted at (A)–(C) for three instants of time ($t_1$–$t_3$) during a period in which the rotor has moved from left to right. At time $t_1$, the winding for the A–B stator pole pair is energized with current flowing in a direction to form a strong south pole at A and a strong north pole at B. The winding for the C–D stator pole pair is not energized. The position of the rotor is shown at (A). North magnet 1 and south magnet 2 overlap stator pole A. South magnet 2 and north magnet 3 overlap stator pole B. At this time magnet 3 is approaching an overlapping position with pole C. South magnet 4 is in substantial alignment with pole C and north magnet 5 is in substantial alignment with pole D. At this time motoring torque is produced by the force of attraction between south pole A and north pole magnet 1, the force of attraction between north pole B and south pole magnet 2, and the force of repulsion between north pole B and north pole magnet 3. Poles C and D have respective weak north and south magnetization caused by the attraction of magnets 4 and 5. This attraction, which seeks to maintain minimum reluctance is in opposition to motor driving torque.

At time $t_2$, the rotor has moved to the position shown at (B). The energization of the pole pair A–B windings has been commutated off. Windings of the C–D pole pair are not energized. Magnets 1 and 2 are substantially in alignment with poles A and B respectively. North magnet 3 and south magnet 4 overlap pole C. South magnet 4 and north magnet 5 overlap pole D. Poles A and B have weak south and north magnetization respectively. The stator poles C and D are influenced by both north and south rotor magnets. Pole C is in a flux path between north pole magnet 3 and south pole magnet 4. Pole D is in a flux path between south pole magnet 4 and north magnet pole 5. A cogging torque thus has developed that opposes the motor driving torque and changes in magnitude as the rotor magnets move from direct alignment with the non-energized stator poles to partial alignment At time $t_3$, the rotor has moved to the position shown at (C). Energization of the A–B pole pair windings has been reversed, causing a strong north pole at pole A and a strong south pole at B. Windings of the C–D pole pair are not energized. North magnet 1 and south magnet 2 overlap stator pole B. South magnet 0 and north magnet 1 overlap stator pole A. At this time south magnet 2 is approaching an overlapping position with pole C. North magnet 3 is in substantial alignment with pole C and south magnet 4 is in substantial alignment with pole D.

As described above, the opposing cogging torque effects motoring torque in a manner that varies with respect to rotational angular position as the rotation proceeds. The cogging torque is most pronounced at transitional points when a rotor magnet is about to face a stator pole across the air gap. An abrupt change in the cogging torque takes place as the leading edge of the generally rectangular surface of a permanent magnet approaches the parallel edge of the rectangular stator pole. Use of high energy density permanent magnet materials such as neodymium-iron-boron (NdFeB) magnetic materials, which impart large flux densities at the air gap in the vicinities of the rotor permanent magnets, heightens this effect to the extent that undesirable vibration can become noticeable. Motors having a large number of stator poles and rotor poles, such as the axially aligned rows of stator poles and rotor magnets, can produce even greater cogging torque effects. In the same manner, cogging torque is produced to a varying extent in motors having unitary stator cores.

A variety of techniques have been utilized to minimize the effects of cogging torque. Such techniques attempt to reduce the rate of reluctance change with respect to rotor position, reduce the magnetic flux in the machine, or shift poles in a unitary stator core such that the cogging torque produced by the individual poles tend to cancel one another. Electronic methods can be used to control the intensity of the electromagnetic interaction that takes place between permanent magnet and electromagnet surfaces. Such methods have disadvantages in that they involve complex control algorithms that are implemented simultaneously with motor control algorithms and tend to reduce the overall performance of the motor. Reduction of magnetic flux diminishes advantages obtained from the newer permanent magnet materials and the flux concentration techniques of the above-identified copending applications. Shifting the location of poles in a conventional unitary stator core structure poses limitations on the size, positions and number of poles, which can prevent an arrangement that provides optimal operation.

Other approaches involve modifying the construction of the machine by changing the shape of the stator poles. Prior art stator poles conventionally made of stacked laminations are not readily amenable to modification. Available lamination machining processes are limited in the ability to reshape conventional patterns, especially three-dimensionally. A substantial range of modification of such laminated structures is too complex and costly to be feasible.

The need thus exists for effective cogging compensation in motors, particularly those having high flux density magnitudes and concentrations, and do not detract from the efficient operation and control capability of the motors while providing practicability of cost and application.

Copending application Ser. No. 10/160,257 addresses this need by shaping stator pole surfaces or rotor magnet surfaces so that the stator pole surface geometric configuration and the rotor magnet surface geometric configuration are skewed with respect to each other. The effect of the skewing arrangement is to dampen the rate of change of cogging torque that is produced by the interaction between a rotor magnet and a pole of a non-energized stator electromagnet as the permanent magnet traverses its rotational path. The ability to selectively shape stator poles is made feasible through the use of core materials such as a soft magnetically permeable medium that is amenable to formation of a variety of particularized shapes. These materials also can be formed to have anisotropic magnetic properties for intended applications. For example, core material may be manufactured from soft magnet grades of Fe, SiFe, SiFeCo, SiFeP powder material, each of which has a unique power loss, permeability and saturation level. These materials can be formed initially in any desired three dimensional configuration, thus avoiding the prospect of machining an already formed hard lamination material.

Copending application Ser. No. 10/160,254 addresses the need described above by offsetting the effects of cogging torque produced in a plurality of axially spaced sets of rotor and stator elements. Poles of each separate axially disposed stator core are shifted or offset with respect to each other in the axial direction to cancel the effects of cogging torque without limiting the positional relationships among the stator poles in the circumferential direction. Alternatively, rotor permanent magnets, which are arrayed in the circumferential and axial directions are offset with respect to each other in the axial direction to cancel the effects of cogging torque without limiting the total number of permanent magnets or their positions in the circumferential direction.

Copending application Ser. No. 10/160,254 addresses the need described above by providing stator poles of varying pole thickness. A selective change in the bulk thickness of a pole shoe changes the concentration of the effective flux at the point of coupling between the stator poles and the permanent magnet pole shoes. A uniform air gap is maintained without a change in the active interfacing area of the pole shoes and rotor magnets.

Minimization of torque ripple and cogging torque effects without detrimentally affecting torque output capability continues to be an important objective.

DISCLOSURE OF THE INVENTION

The present invention fulfills the above-described needs, at least in part, by provision of stator poles that have varying pole thickness. The poles are constructed with base portions that terminate at pole shoes at the air gap. The pole shoes extend in the circumferential direction from the bulkier base portions. In accordance with the invention, a selective change in the bulk thickness of the pole shoe changes the concentration of the effective flux at the point of coupling between the stator poles and the permanent magnet pole shoes. An advantage of the present invention is that there is no change in the active interfacing area of the pole shoes and a uniform air gap is maintained. Thus there is no change in magnetic reluctance of the localized magnetic circuit interface caused by the air gap or the active surface areas.

A further advantage of the invention is that the torque signature for each stator pole/rotor permanent magnet interface can be selectively changed to smooth motor operation by configuring the stator pole shoe thickness to vary along its circumferential extent as appropriate. Pole shoes may have tapered leading or trailing edges with respect to a pole base to change the effective flux density in the air gap at a specific pitch of rotation. In accordance with another aspect of the invention, the above objectives may be realized by shifting the pole shoe off center with respect to the pole base. For example, placement of the bulk of the pole material toward the trailing edge of the pole with respect to the direction of magnet rotation, with a relatively constant pole shoe extension thickness, can provide beneficial effect. This effect can be further modified by varying the thickness of the pole shoe extension.

The structural features of the invention are embodied in a motor that comprises a rotor having a plurality of permanent magnets distributed circumferentially about an axis of rotation and a stator spaced from the rotor by a radial air gap of substantially uniform dimension. The stator comprises a plurality of poles distributed about the air gap. Each stator pole is configured with a base portion and a pole shoe that faces the air gap. The pole shoe may extend in both circumferential directions from the base portion. The pole shoe extensions may be of variable thickness in the radial direction while the dimension of the air gap is maintained substantially uniform. The manner in which the pole shoe thickness is varied and the relative spacing between either end of the pole shoe and the base portion are selected to tailor the torque and force signatures of a given machine for an intended application.

The pole shoe may be tapered in thickness along either or both extension portions, narrowing toward the leading and/or trailing ends. Alternatively, the pole shoe may be tapered to increase in the same circumferential direction in both extension portions so that it is substantially thicker at one end than the other. In addition, the pole shoe may be offset with respect to the center of the base portion to provide a further variation in the effective thickness of the pole. If the offset is sufficient in itself to provide the intended torque ripple smoothing, the pole shoe extensions may be configured with relatively uniform thickness. Preferably, the permanent magnets of the rotor are magnetic bipoles, each having a single magnetic polarity at a surface facing the air gap, and spaced from each other. The length of each magnet in the circumferential direction can be substantially the same as the length of each stator pole shoe in the circumferential direction.

The above described pole structures can be provided, with advantageous results, in a stator arrangement having a plurality of separated, ferromagnetically isolated, electromagnet core segments. Each segment may be formed of a pole pair, such as shown in FIG. 1. The stator is a single annular ring encompassing a single pole in the axial direction and a plurality of pole pairs in the circumferential direction. In other arrangements, multiple rings of stator poles are axially spaced, formed by a plurality of separated, ferromagnetically isolated, electromagnet core segments. Each of the core segments comprises a plurality of poles integrally joined by one or more linking portions extending generally in the direction of the axis of rotation. The stator thus forms a plurality of poles in the axial direction with a single pole of each segment distributed in the circumferential direction in each ring. In the latter arrangements, the rotor is formed of axially spaced rings of separated magnets disposed circumferentially along the air gap, the number of rotor rings being equal to the number of stator poles in a stator core segment.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF DRAWINGS

The present invention is illustrated by way of example, and not by way of limitation, in the figures of the accompanying drawing and in which like reference numerals refer to similar elements and in which.

DETAILED DESCRIPTION OF THE INVENTION

Figure 1:
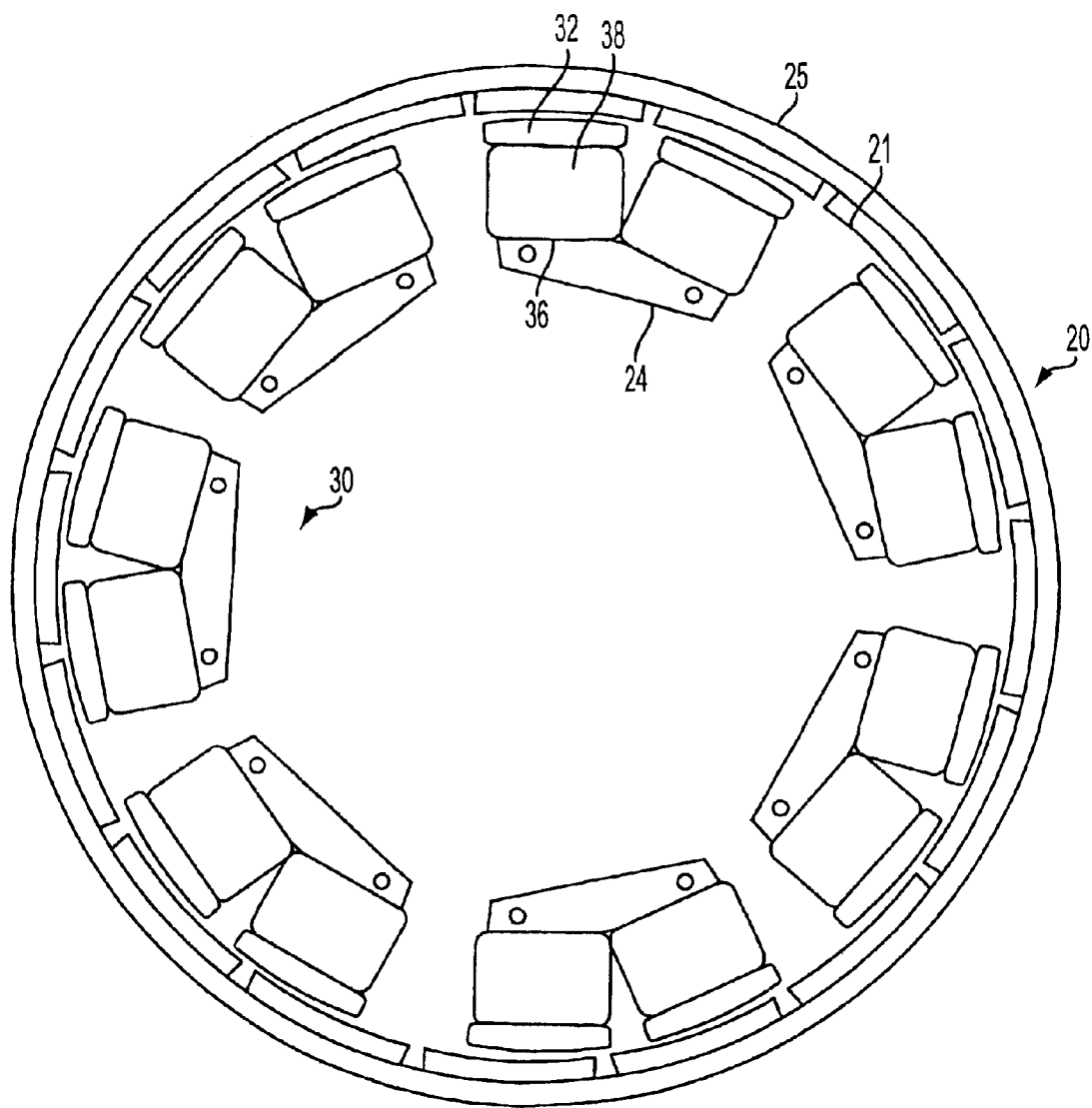
FIG. 1 is an exemplary view showing rotor and stator elements of a motor such as disclosed in the copending application Ser. No. 09/826,422.
Figure 2:
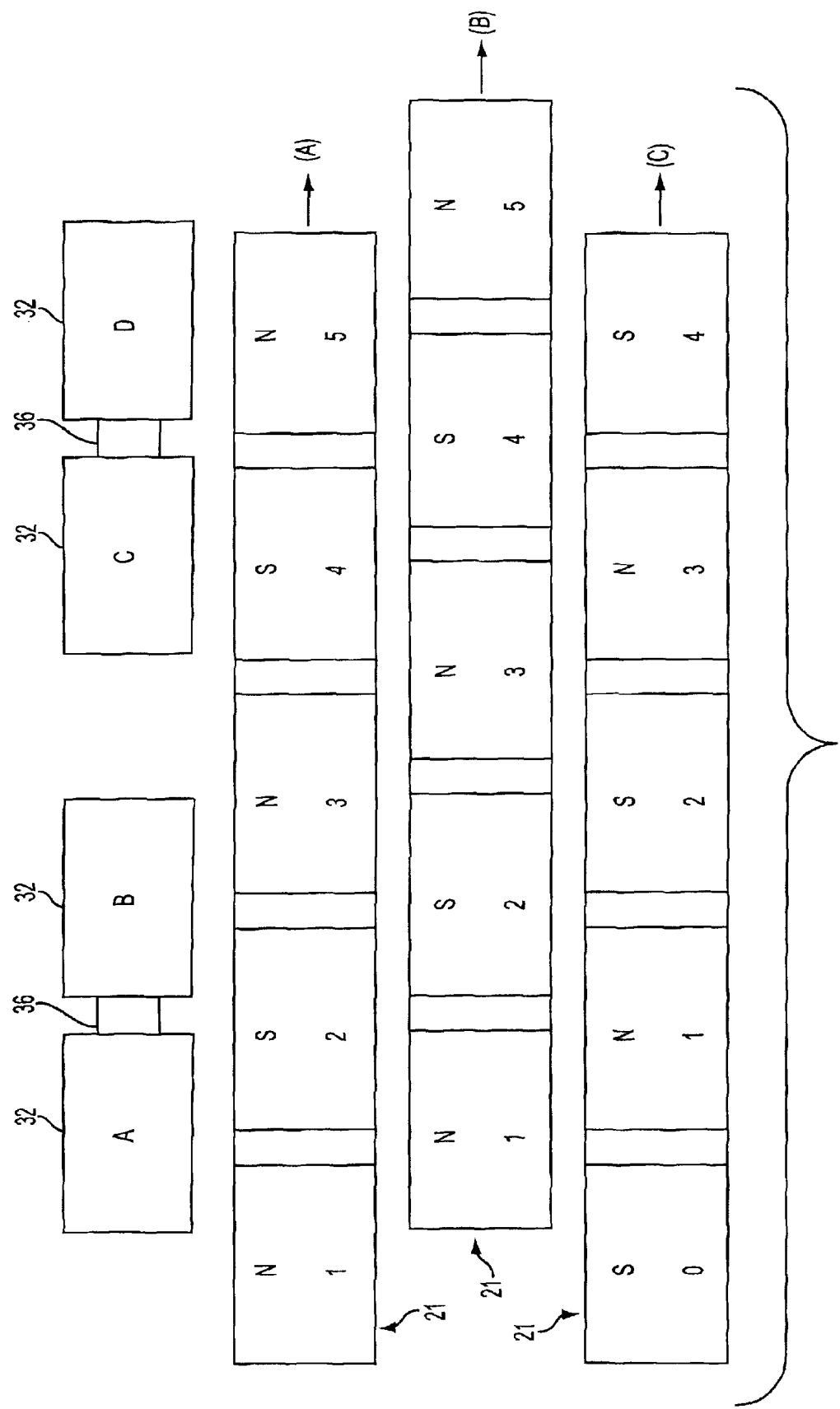
FIG. 2 is a partial plan layout of elements of FIG. 1 illustrating relative positions of stator pole surfaces and rotor surfaces for three instants of time during motor operation.
Figure 3:
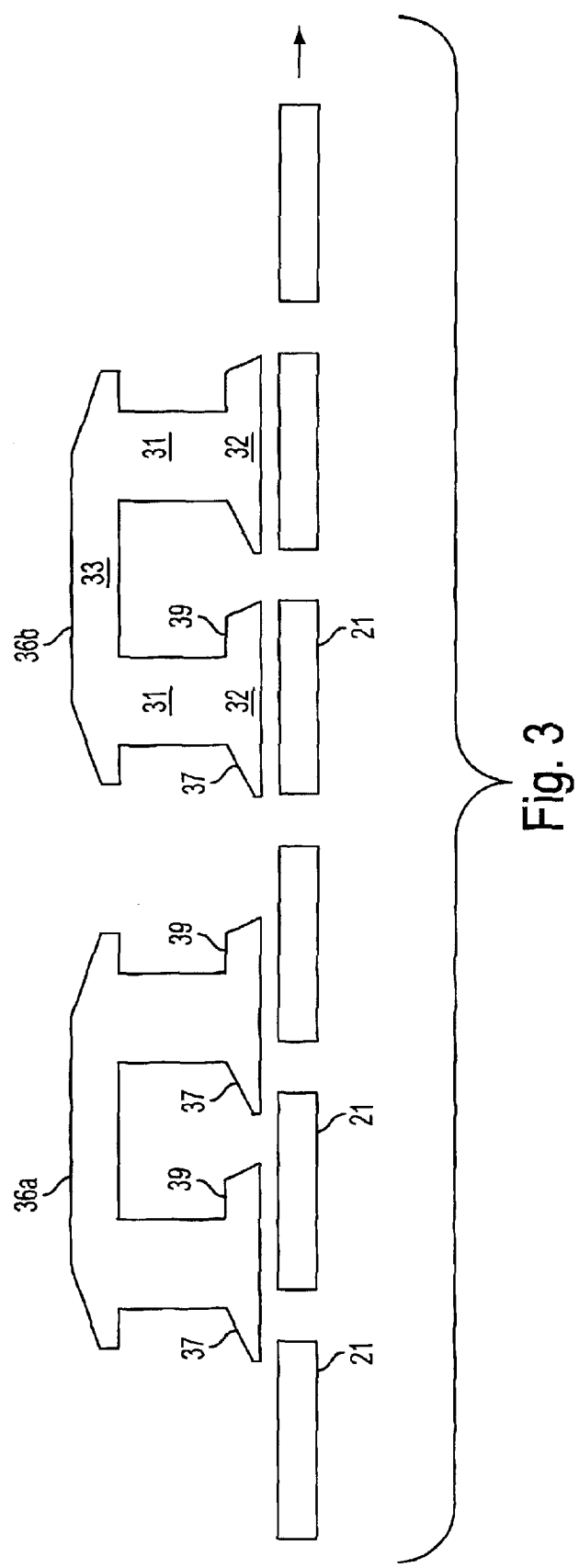
FIG. 3 is diagram of a partial plan layout of stator poles in relation to rotor permanent magnet surfaces in accordance with the present invention.

The concepts of the present invention are applicable to motors having a single set of circumferentially disposed rotor and stator elements concentrically arranged about a radial air gap such as the motor of FIG. 1, described above, as well as to motors having two or more axially spaced sets of rotor and stator elements. FIG. 3 is diagram of a partial plan layout of a motor such as illustrated in FIG. 1, with stator poles modified in accordance with the present invention shown in relation to rotor permanent magnet surfaces. It is to be understood that this layout is representative of a rotary motor with rotor and stator in concentric relationship with each other, separated by a radial air gap.

The rotor magnets 21, of successive alternating magnetic polarity, are shown absent supporting structure for clarification of the arrangement. Stator core elements 36a and 36b each comprise a pair of poles having base portions 31 and pole shoe portions 32. The poles are integrally linked to each other by linking portion 33. Energization windings, not shown, for each pole pair may be formed in well known manner on the pole base portions or on the linking portion. Each pole shoe extends outwardly in both circumferential directions from the pole base portion by pole shoe extensions 37 and 39. Pole shoe extension 37 is tapered in radial thickness from the base portion to its narrowest dimension at the end of the pole shoe. Pole shoe extension 39 has a portion of relatively small uniform thickness. While only two stator segments are shown in the figure for clarity of illustration, any number of stator phases may be employed.

In this illustration, it is assumed that the rotor magnets rotate in a direction from left to right in operation. The leading edges of the magnets 21 thus first approach the tapered pole shoe extensions 37 of the stator. For clarification of description, pole shoe extension 37 is designated as a leading extension and pole shoe extension 39 is designated as a trailing extension. It is further assumed that the winding of the left hand stator segment 36a is not energized during the time period in which the magnets 21 are approaching alignment with the stator pole shoes. The flux generated across the air gap by permanent magnet 21 produces an attractive force between the magnet and the stator pole. The leading edge of magnet 21 approaches pole shoe extension 37 at the transitional point of overlap. As the thickness of the tapered pole shoe is least at this point and the ferromagnetic flux path through the pole shoe is at a minimum, the resulting cogging torque is not abruptly pronounced. Due to the taper, the flux path through the pole extension gradually increases, thereby smoothing the cogging torque effect. Flux linkage between the stator shoe and permanent magnet is maximum when these elements are in overlapping positions such as shown in the figure with respect to stator segment 36b. The trailing pole shoe extension 39, by virtue of its relatively small thickness, reduces the effective flux linkage at the trailing edge of the overlapping rotor magnet. The pole shoe structure thus provides an improved torque signature as severe cogging torque oscillations are avoided.

Figure 4:
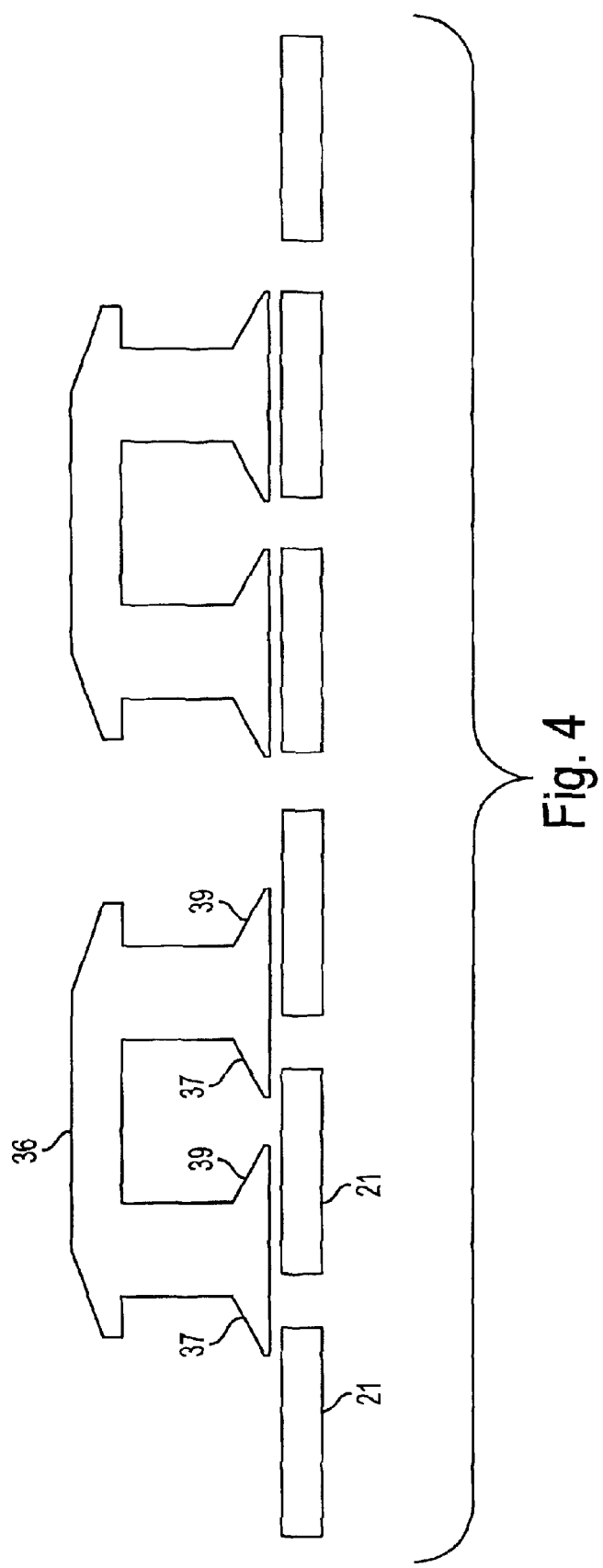
FIG. 4 is diagram of a partial plan layout of stator poles in relation to rotor permanent magnet surfaces in accordance with a variation of the embodiment of FIG. 3.

FIG. 4 illustrates a variation of the structure shown in FIG. 3. This structure differs from that of FIG. 3 in that trailing pole shoe extension 39 is tapered between the pole base and its end in a manner similar to the taper of pole extension 37. The trailing flux linkage is thus reduced progressively toward the end of the pole extension 39 so that the attractive effect of the passing rotor magnet further smoothes the cogging effect. The pole structure of FIG. 4 has the additional advantage in that it provides substantially the same effect for each direction of motor rotation. As the angle of taper of the pole extensions affects the rate of change of flux linkage in the air gap, the taper angle can be selected to provide optimum torque signature.

Figure 5:
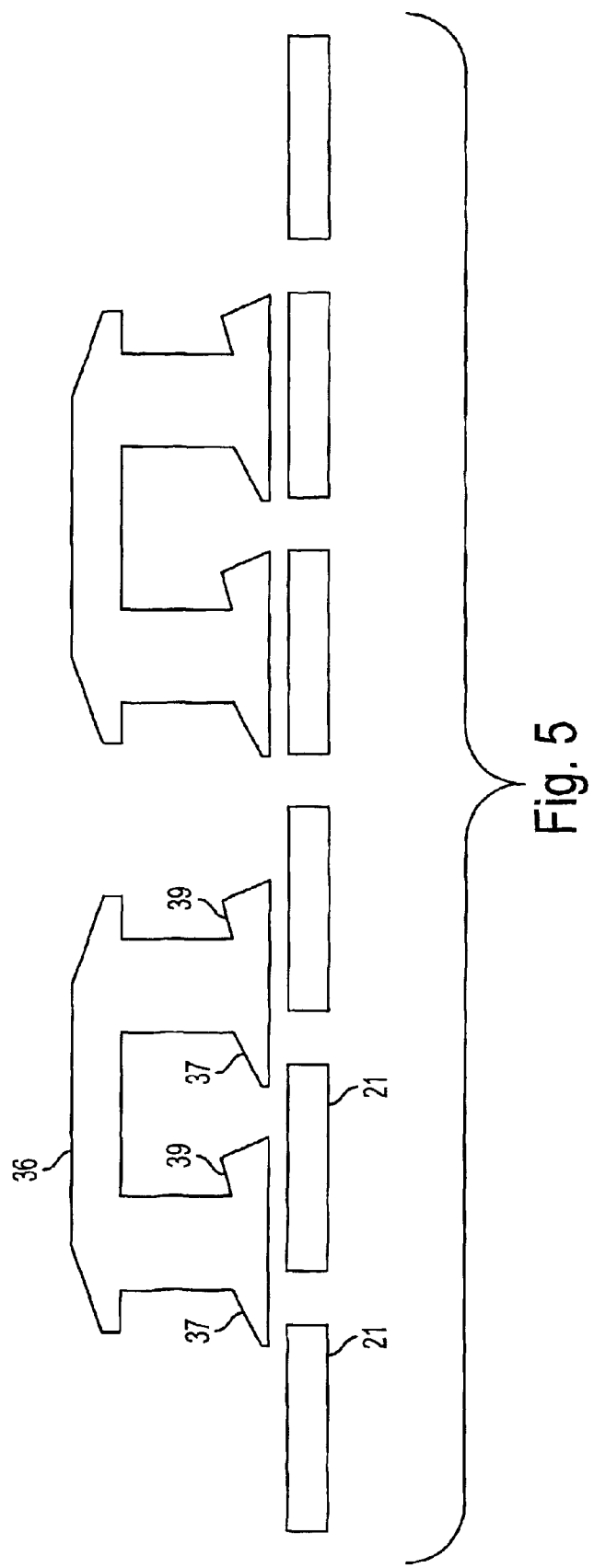
FIG. 5 is diagram of a partial plan layout of stator poles in relation to rotor permanent magnet surfaces in accordance with another variation of the embodiment of FIG. 3.

With a plurality of stator pole pairs, various winding energization pattern options are available to obtain desired operational characteristics for a particular motor application and structural arrangement. Winding energization sequence and timing may well require that a plurality of pole pairs are de-energized in overlapping intervals. As the individual effects of cogging torque of the various pole pairs may be additive and/or subtractive, the overall torque signature should be taken into account in the selection of the pole configuration. FIG. 5 illustrates another variation of the structure of FIG. 3. Trailing pole shoe extension 39 has a radial thickness that increases between the pole base and its end. Both extensions are tapered by substantially the same angle in the same direction. The increased thickness may provide a counteracting effect with respect to cogging torque generated by rotor magnet interaction with other stator poles.

Figure 6:
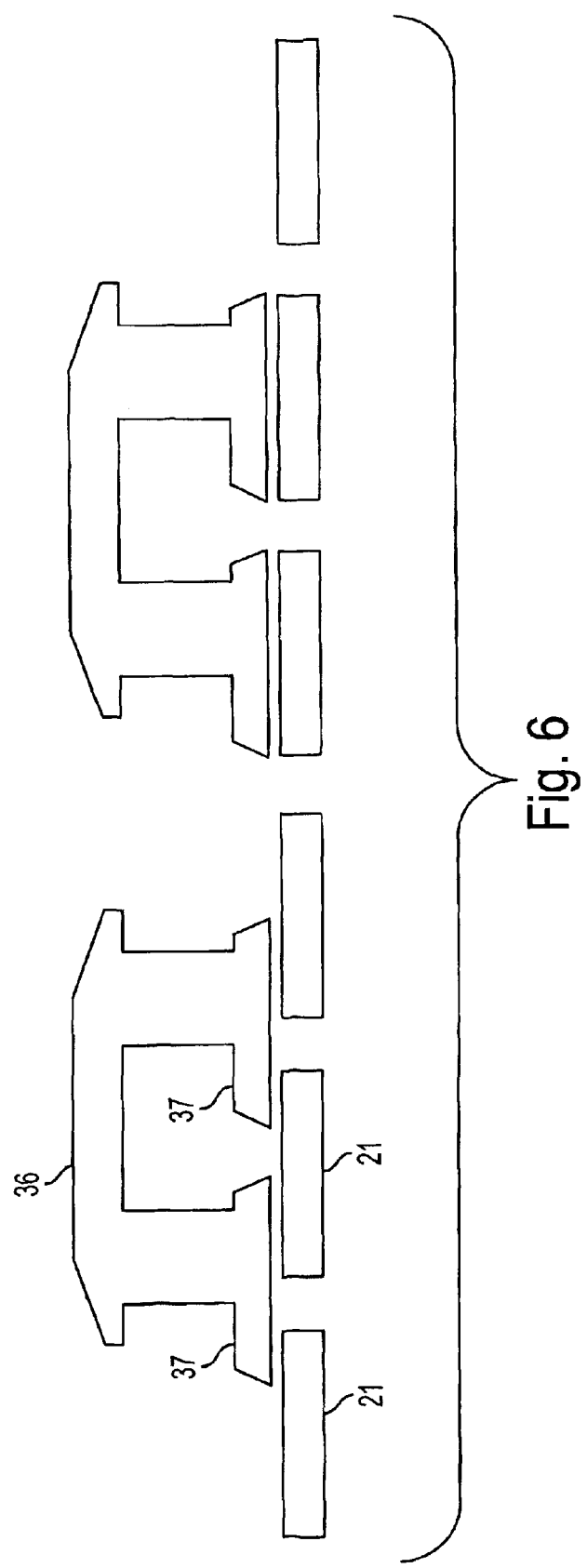
FIG. 6 is diagram of a partial plan layout of stator poles in relation to rotor permanent magnet surfaces in accordance with another variation of the embodiment of FIG. 3.
Figure 7:
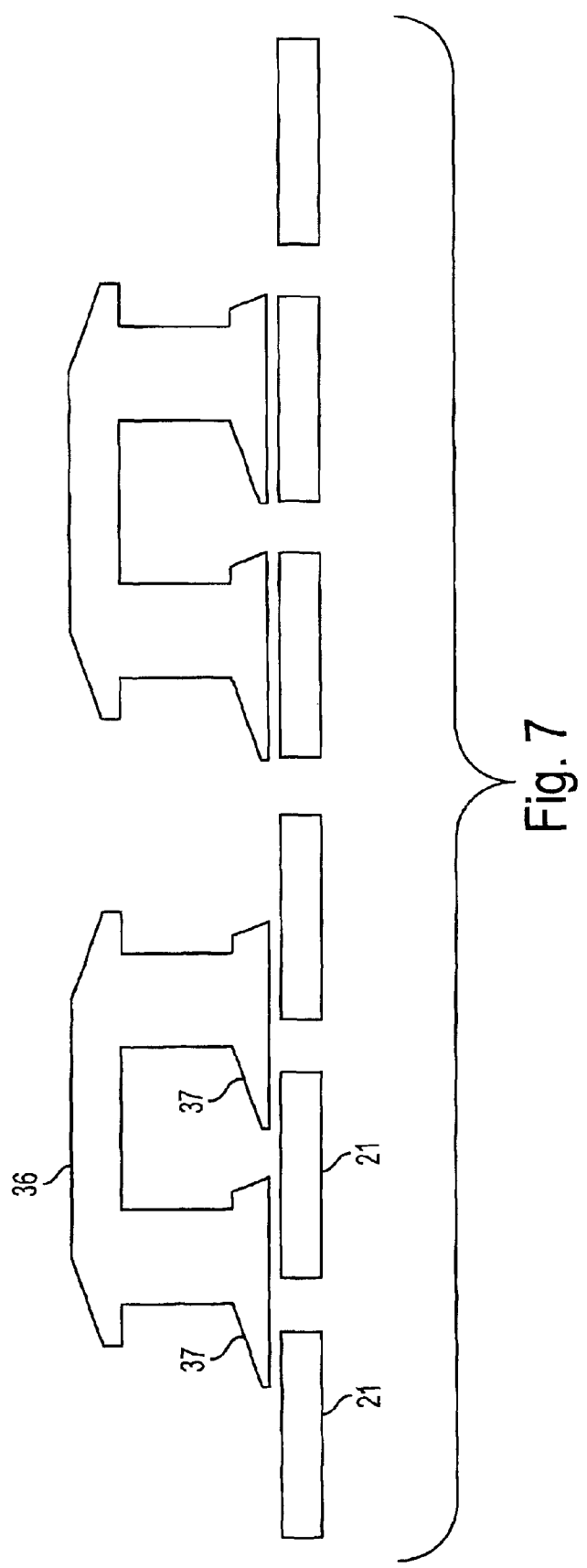
FIG. 7 is diagram of a partial plan layout of stator poles in relation to rotor permanent magnet surfaces in accordance with a variation of the embodiment of FIG. 6.

FIGS. 6 and 7 are additional variations of the pole shoe structures of the preceding examples illustrated in FIGS. 3–5. In the arrangements of FIGS. 6 and 7, the pole shoes are offset from the base to form longer leading extensions 37 than the earlier examples and virtually no trailing extensions. The extensions 37 have relatively small radial thickness, which are relatively uniform in FIG. 6 or tapered in FIG. 7. Pole shoe extensions 37 provide less flux linkage and have a significantly lower effect on cogging torque than the bulkier base portion. As the point at which the leading edge of magnet 21 arrives at an overlapping position with the bulkier base portion is delayed, the magnitude of the cogging torque waveform is shifted accordingly.

The benefits of the stator pole structural variations described above are applicable other stator/rotor configurations. For example, a stator having an integral continuous stator core may have salient poles formed as described with respect to any of FIGS. 3–7 to provide cogging torque compensation. Such pole formations may be implemented to alleviate cogging torque manifestations in motors having a single axially aligned row of magnets and stator poles.

Figure 8:
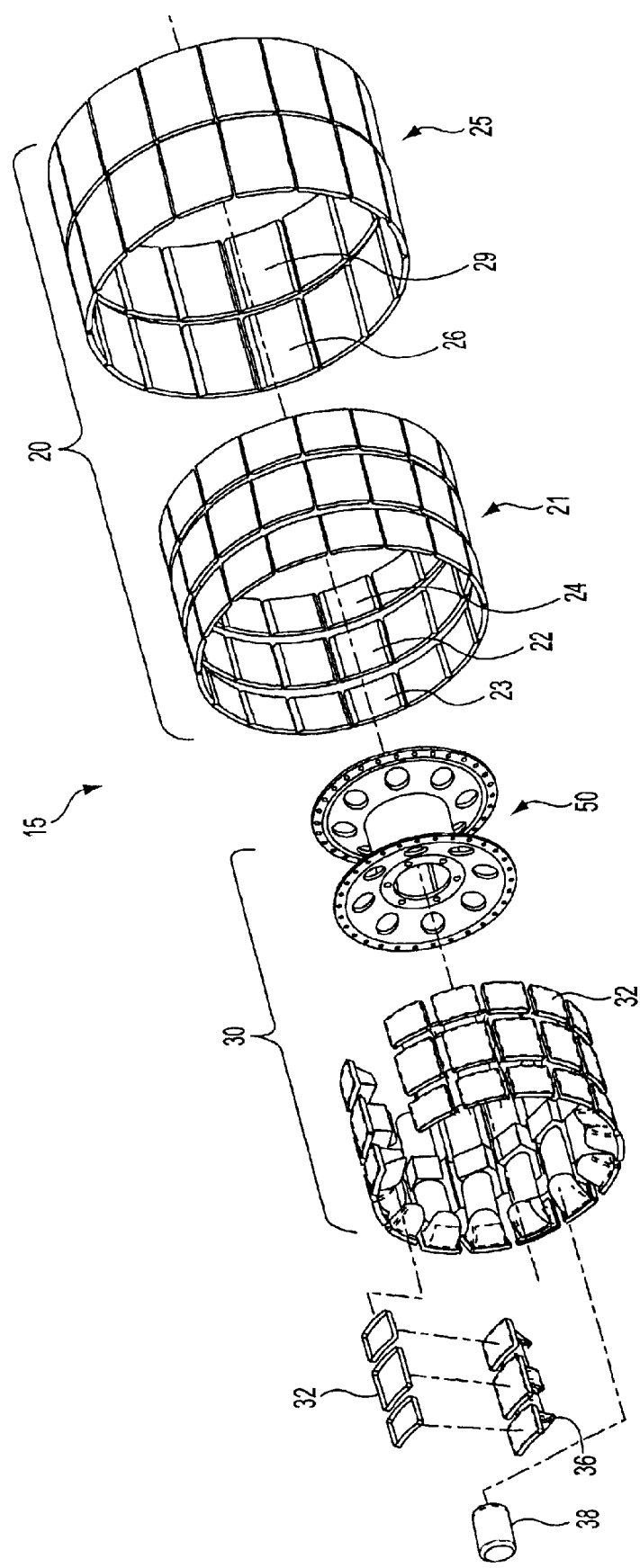
FIG. 8 is a three-dimensional exploded view of a motor having axially aligned stator and rotor elements, such as disclosed in copending application Ser. No. 10/067,305, that may incorporate stator pole structures of FIGS. 3–6.

FIG. 8 illustrates a three-dimensional exploded view of a motor such as disclosed in copending application Ser. No. 10/067,305. Motor 15 comprises annular permanent magnet rotor 20 and annular stator structure 30 separated by a radial air gap. A plurality of ferromagnetically isolated stator core segment elements 36, made of magnetically permeable material, are supported by support structure 50, which maintains ferromagnetic isolation of the segments. Segment 36 is an integral structure formed of a magnetically permeable material with pole surfaces 32 facing the air gap. The pole faces of each core segment may have different surface areas, as shown, or may have identical surface configuration. Each stator core element 36 is an electromagnet including windings 38 formed on the core material. Reversal of the direction of energizing current, in known manner, effects reversal of the magnetic polarities of each of the poles. The rotor comprises a permanent magnet section 21 with three axially spaced rings of rotor magnets 22–24, circumferentially distributed about the air gap, and a back iron ring 25 upon which the permanent magnets are mounted. Stator support structure 50 may be affixed to a stationary shaft, the rotor mounted within a housing that is journalled to the shaft through appropriate bushings and bearings.

The stator poles shown in FIG. 8 may be constructed as shown in any of the variations of FIGS. 3–7. As a great number of magnets and stator poles are provided in both the circumferential direction and the axial rotation, compensation is provided for a potentially great cogging torque disturbance.

In this disclosure there are shown and described only preferred embodiments of the invention and but a few examples of its versatility. It is to be understood that the invention is capable of use in various other combinations and environments and is capable of changes or modifications within the scope of the inventive concept as expressed herein. For example, each of the layouts illustrated in the drawings can be implemented with unitary, instead of segmented, stator cores with beneficial results. Also, although the illustrated examples depict the stator pole pitch to be substantially equal to the rotor pole pitch for clarity of explanation, the circumferential distance between a pair of stator poles may be greater or less than the distance between a rotor magnet pair.

While specific geometric configurations of the stator core elements have been illustrated, it should be recognized that the inventive concept herein encompasses a multitude of variations of these configurations as virtually any shape can be formed using the powder metal technology. Thus a specific core configuration can be tailored to the flux distribution desired. For example, it is within the concept of the invention that different sets of pole pairs can have pole shoes respectively with different configurations.

Although the description of the present invention depicts the stator surrounded by the rotor, the concepts of the invention are equally applicable to motors in which the rotors are surrounded by stators.

What is claimed is:

1. A rotary electric motor comprising:
   a rotor having a plurality of permanent magnets distributed circumferentially about an axis of rotation;
   a stator spaced from the rotor by a radial air gap of substantially uniform dimension, said stator comprising a plurality of core segments, each segment having a pluratily of the poles, the core segment being separated, and ferromagnetically isolated from each other, and distributed about the air gap; wherein
   each stator pole comprises a pole shoe facing the air gap, the pole shoe having a variable thickness in the radial direction while maintaining the dimension across the air gap between a surface of the pole shoe and a surface of a permanent magnet substantially uniform.

2. A rotary electric motor as recited in claim 1, wherein the pole shoe extends a predetermined distance in a circumferential direction from a base portion of the pole and the pole shoe is tapered in thickness along said predetermined distance.

3. A rotary electric motor as recited in claim 2, wherein said thickness tapers in direction from is greatest dimension proximate the base portion to its least dimension at one end of the pole shoe remote from the base portion.

4. A rotary electric motor as recited in claim 3, wherein the thickness of the pole shoe decreases in a direction opposite to the direction of rotation of the motor.

5. A rotary electric motor as recited in claim 3, wherein the thickness of the pole shoe increases in a direction opposite to the direction of rotation of the motor.

6. A rotary electric motor as recited in claim 3, wherein the pole shoe extends from the base portion of the pole in a second circumferential direction to a second end.

7. A rotary electric motor as recited in claim 4, wherein the pole shoe is tapered between the base portion of the pole and the second end.

8. A rotary electric motor as recited in claim 7, wherein the thickness of the pole shoe increases from the base portion to the second end.

9. A rotary electric motor as recited in claim 6, wherein a first length of the pole shoe in the circumferential direction between the base portion and the one end is different from a second length of the pole shoe in the circumferential direction between the base portion and the second end.

10. A rotary electric motor as recited in claim 9, wherein the first length is greater than the second length.

11. A rotary electric motor as recited in claim 1, wherein the permanent magnets of the rotor are spaced from each other and each permanent magnet is a magnetic bipole having one magnetic polarity at a surface facing the air gap and the opposite magnetic polarity facing away from the air gap; and
    the length of each magnet in the circumferential direction is substantially the same as the length of each stator pole shoe in the circumferential direction.

12. A rotary electric motor as recited in claim 11, wherein the magnetic reluctance of the magnetic circuits comprising the permanent magnets, facing stator poles and air gap is substantially uniform.

13. A rotary electric motor as recited in claim 1, wherein each of the core segment comprises a pluratily of poles integally joined by one more linking portions to form an axial row of poles extending generally parallel to the axis of rotation; and
    the rotor permanent magnets have surface facing the air gap and form axially spaced rings of separated magnets disposed circumferentially along the gap, the number of said rings being equal to the number of stator poles in a stator core segment.

* * * * *